United States Patent [19]
Ohmi et al.

[11] Patent Number: 5,539,171
[45] Date of Patent: Jul. 23, 1996

[54] WELDING SYSTEM FOR SUPERHIGH PURITY FLUID SUPPLY PIPE SYSTEM

[75] Inventors: Tadahiro Ohmi; Masakazu Nakamura, both of Miyagi-ken, Japan

[73] Assignee: Tadahiro Ohmi, Miyagi-ken, Japan

[21] Appl. No.: 244,128

[22] PCT Filed: Nov. 20, 1992

[86] PCT No.: PCT/JP92/01523

§ 371 Date: May 19, 1994

§ 102(e) Date: May 19, 1994

[87] PCT Pub. No.: WO93/09907

PCT Pub. Date: May 27, 1993

[30] Foreign Application Priority Data

Nov. 20, 1991 [JP] Japan ..................... 3-331352

[51] Int. Cl.$^6$ .................................. B23K 9/167
[52] U.S. Cl. ..................... 219/61; 219/74; 219/137 R
[58] Field of Search ................... 219/61, 60 R, 219/74, 75, 137 R; 228/199, 201, 202

[56] References Cited

U.S. PATENT DOCUMENTS 2,905,805  9/1959  McElrath et al. .................. 219/74

FOREIGN PATENT DOCUMENTS 61-273257  12/1986  Japan ..................... 219/61
62-101381   5/1987  Japan .

*Primary Examiner*—Clifford C. Shaw
*Attorney, Agent, or Firm*—Baker & Daniels

[57] ABSTRACT

A welding system for superhigh purity gas supply system, capable of removing easily and completely the metals deposited, during the installation of the superhigh purity gas pipe system, on the outer surfaces of the portions of the pipes which are closed to the portions to be welded thereof and on the inner portions of these pipes, and capable of setting up a superhigh purity gas supply system in a short period of time. A welding system for the gas supply pipe system in which a plurality of members are connected together by welding, characterized in that a first member to be welded(113) is provided with a means for supplying an inert gas or a welding back seal gas and a means for supplying superpure water, a second member to be welded(114) being provided with a means for discharging the inert gas or back seal gas and a means for discharging the superpure water, the first and second members being welded as the inert gas or back seal gas is being supplied, the superpure water being supplied after the welding of these members has been completed, whereby the metal fume deposited on the surfaces of the welded members during the welding thereof can be washed out.

9 Claims, 4 Drawing Sheets

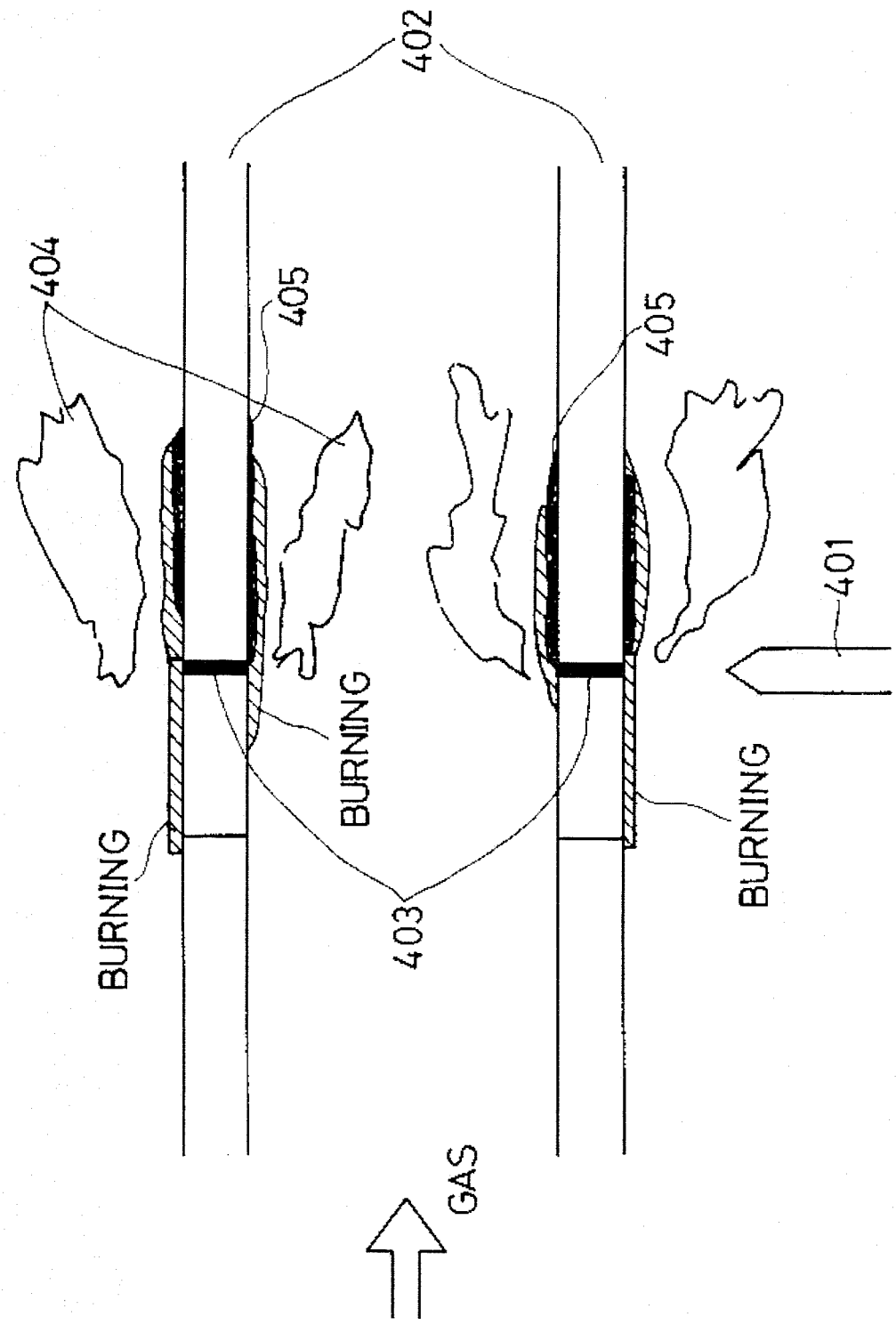

WELDING SYSTEM FOR SUPERHIGH PURITY FLUID SUPPLY PIPE SYSTEM

TECHNICAL FIELD

The present invention relates to a welding system for super high purity fluid supply pipe systems, and in particular, relates to a welding system for super high purity gas supply pipe systems which is capable of reducing the installation costs of supply systems and the like for super high purity gasses, pure water, chemicals, or the like, which are required for manufacturing apparatuses for high performance semiconductor devices and the like, and which is capable of a rapid high performance setup after installation.

BACKGROUND OF THE INVENTION

Tungsten-inert gas welding, arc gas welding, beam welding, and the like, are widely employed as methods of connecting pipes and fluid parts, such as valves, regulators, and the like, which are employed in fluid supply pipe systems. However, in this conventional welding technology, the surface roughness of the welded portions, and the deposition of metal on the inner surfaces of supply system pipes as a result of metal fumes released from the fused portion, have not been considered. In particular, in conventional gas supply pipes or parts having welded portions, no treatment was made with respect to the deposition of metal fumes generated by welding on the inner surfaces of supply system pipes, so that on contact with extremely active special material gasses, these deposited metals tended to corrode and be separated. As a result, the use points, such as semiconductor manufacturing devices and the like, which employed gasses were subject to metal contamination, and this has been recognized as an important factor blocking an increase in performance of such semiconductor devices. Furthermore, while no problems occurred over short periods of time with respect to inert common gasses, it has been discovered by the present inventors that there are some problems with reliability over longer periods.

The deposition of metal fumes as a result of the welding of fluid and gas supply pipe systems, and the surface roughness of the welded portions, will be explained in greater detail using FIG. 4. FIG. 4 shows welded portions in which pipe materials are welded by means of tungsten-inert gas welding. In the figure, reference 401 indicates a tungsten gas electrode, while reference 402 indicates pipe materials which are subjected to welding. Reference 403 indicates a welded portion, while reference 404 indicates metal fumes which are released from the fused portion. These metal fumes 404 are carried by the arc gas or back seal gas flow and are deposited on the surface of the pipe material 402 at the downstream side of welded portion 403, and become deposited metals 405. These deposited metals 405 do not present the problem of separation with respect to inert gasses; however, when a corrosive gas, for example, hydrogen chloride gas, is caused to flow, the deposited metals 405, which are not bonded to the surface of the material, but are merely deposited thereon, are subject to separation. The separating metals comprise Fe, Ni, Cr, and Mn, which are chiefly contained in the metal materials, and because these metals exert a great influence on the LSI characteristics, the removal of these metals is a crucial problem in semiconductor production.

However, in installation methods for fluid supply pipe systems, such as current semiconductor production apparatuses or the like, there has been no effective removal of the above metal contaminants, and there has been, in particular, a great desire for a welding system which can be applied to apparatuses requiring a highly clean atmosphere.

The present invention was created in light of the above circumstances; it has as an object thereof to provide a welding system for super high purity fluid supply pipe systems which is capable of easily and completely removing metals deposited at the vicinity of the surface of the welded portion and at the inner portions of the fluid supply system, during the installation of a super high purity fluid supply pipe system, and which is furthermore capable of setting up a super high purity supply system in a short period of time.

Disclosure of the Invention

The present invention resides in a welding system for fluid supply pipe systems in which a plurality of members to be welded are connected by welding, wherein a first member to be welded is provided with a mechanism for supplying an inert gas or for supplying a back seal gas for use in welding, and with a super pure water supply mechanism, a second member to be welded is provided with a discharge mechanism for the inert gas or the back seal gas, and with a super pure water discharge mechanism, and the first and second members to be welded are welded as the inert gas or back seal gas is being supplied, and after welding, the super pure water is supplied, and it is thus possible to wash out the metal fumes which are deposited on the inner surface of the members to be welded as a result of welding.

Function

An inert gas or a back seal gas is supplied to the welded portion via an inert gas supply mechanism or a back seal gas supply mechanism, and thereby, it becomes possible to prevent the burning of the surface of the welded portion, which is the source of particle contamination. During welding, metal fumes are released from the fused portion and are redeposited at the downstream side of the welded portion.

Next, super pure water is introduced from the super pure water supply mechanism, and is passed through the welded portion and is discharged by the discharge mechanism, and thereby, it is possible to wash out the metal which is deposited on the inner surfaces of the pipe system as a result of welding. In order to greatly reduce the substances remaining after the deposited metals are washed out, and to prevent secondary contamination, super pure water is used, and in particular, water having a resistivity of 18 MΩ·cm or more, and an amount of metals contained of 100 ppt or less, is preferable. Furthermore, the water temperature should be within a range of 20° C.–100° C. in order to increase the washing effect, and a range of 40° C.–80° C. is further preferable. The washing period differs depending on water temperature; however, in the case of water at a temperature of 40° C., a period of approximately 1 hour is required.

After washing, it is preferable that an inert gas such as nitrogen gas, Ar gas, or the like, be supplied, the inner surfaces be desiccated, and a constant clean atmosphere be maintained.

The welding system in accordance with the present invention is capable of conducting the welding, washing with super pure water, and desiccation, by block, particularly during the installation of piping, and is capable of conducting washing and desiccation from blocks which have been welded, so that it is possible to install a super high purity fluid supply pipe system without sacrificing the installation speed of the super high fluid supply system.

BRIEF DESCRIPTION OF THE DRAWINGS

FIG. 4 is a conceptual diagram showing problems in the conventional welding technology.

Figure 1:
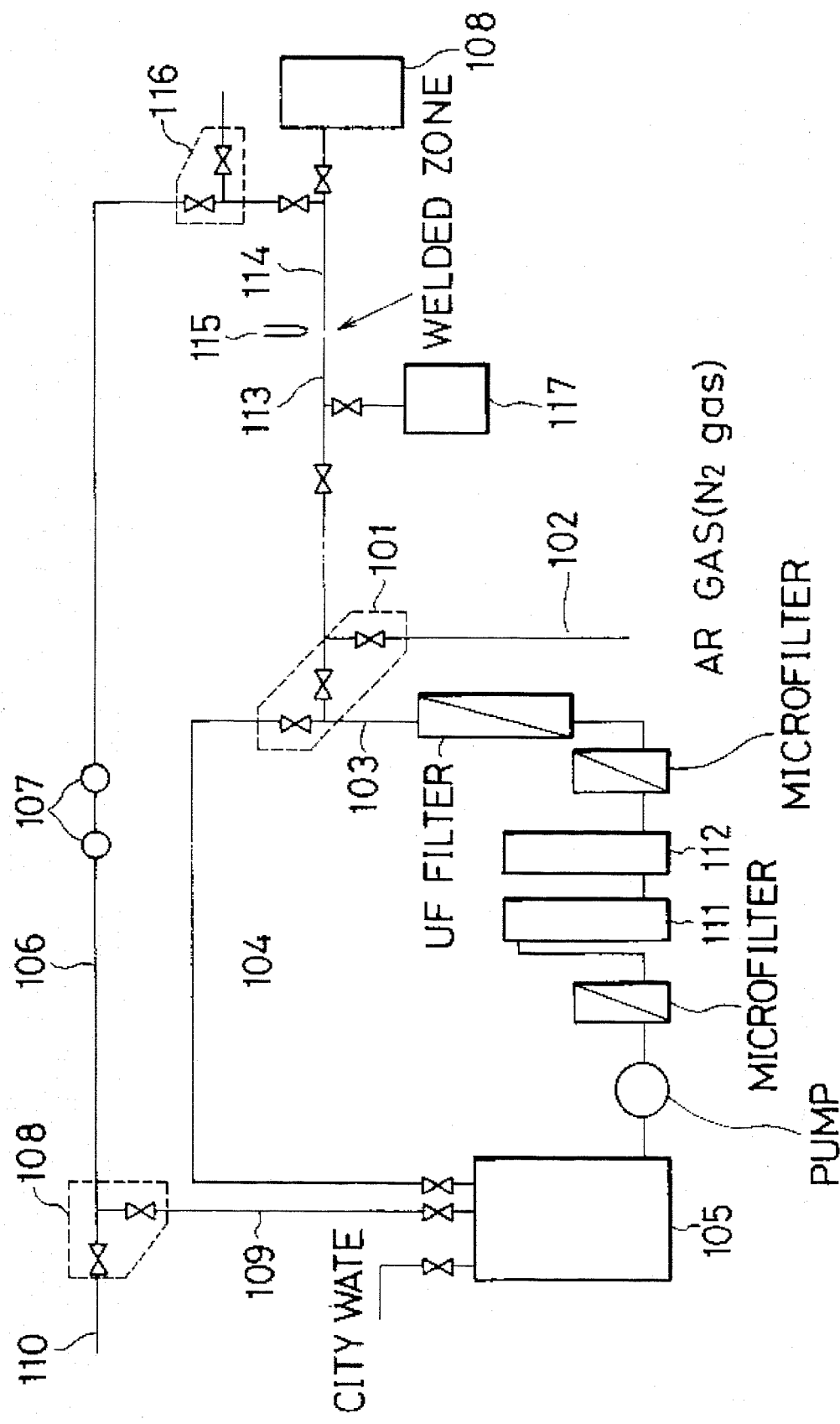
FIG. 1 is a conceptual diagram showing a first embodiment of the present invention.

Reference 101 indicates a double three-way valve, reference 102 indicates a gas supply pipe, reference 103 indicates a super pure water supply pipe, reference 104 indicates a super pure water circulation pipe, reference 105 indicates a source water tank, reference 106 indicates a discharge recycling line, reference 107 indicates a particle measurement apparatus and a resistivity measurement apparatus, references 108 and 116 indicate double three-way valves, reference 109 indicates a pipe, reference 110 indicates a discharge pipe, reference 111 indicates an activated carbon column, reference 112 indicates an ion exchanging resin column, references 113 and 114 indicate pipes to be welded, reference 115 indicates a tungsten electrode, reference 117 indicates a semiconductor gas supply apparatus, reference 118 indicates a semiconductor processing apparatus, references 201 and 206 indicate blocks of a gas supply system, references 203 and 203' indicate flow diversion valves, reference 204 indicates a double three-way valve, reference 205 indicates a super pure water supply line, reference 301 indicates a pipe, reference 302 indicates a flow diversion valve, references 303 and 304 indicate triple four-way valves, reference 305 indicates a pipe, reference 306 indicates a block during super pure water washing, reference 307 indicates a super pure water supply line, reference 308 indicates a discharge line, reference 310 indicates a bypass pipe, reference 401 indicates a tungsten electrode, reference 402 indicates pipe materials which are subjected to welding, reference 403 indicates a welded portion, reference 404 indicates metal fumes, and reference 405 indicates deposited metal.

BEST MODE FOR CARRYING OUT THE INVENTION

Hereinbelow, the welding system for super high purity fluid supply pipe systems in accordance with the present invention will be explained using embodiments; however, it is of course the case that the present invention is in no way limited to the embodiments described.

Embodiment 1

A first embodiment of the present invention is depicted in FIG. 1. FIG. 1 shows a structural example for installing the welding system of the present invention in a gas supply system which supplies gas from a semiconductor fluid supply apparatus 117 to a use point, for example, a semiconductor processing apparatus 118.

By means of the opening and closing of double three-way valve 101, Ar gas is supplied to SUS316L pipes 113 and 114 from a gas supply system which is connected to pipe 102, and this gas is discharged outside the system via double three-way valve 116. In this state, pipes 113 and 114 are welded by means of tungsten-inert gas welding. Reference 115 indicates a tungsten electrode which is employed in the welding.

Next, double three-way valves 101 and 116 are switched, super pure water is supplied to the pipes which have been welded, the impurities such as metal fumes and the like deposited within the pipes are washed out, and this water is discharged to discharge line 106.

After supplying super pure water having a temperature of 30° C. for a period of 5 hours, three-way valves 101 and 116 are again switched, nitrogen gas is introduced into pipes 113 and 114, and the gas is discharged, and the flow is continued until the moisture is completely purged.

In order to evaluate the degree of cleanliness of the gas supply system described above, the following tests were conducted with respect to the gas supply system of the present invention and with respect to a gas supply system having the same form which was installed by the conventional method.

Hydrogen chloride gas having a moisture content of 1.4 ppm was introduced into the gas supply system from semiconductor gas supply apparatus 117, and was maintained in the system at a pressure of 2.5 Kg/cm$^2$ for a period of 12 hours. After this, 250 cc/min of Ar gas was supplied, metal atoms present in the gas were collected on a silicon wafer at the gas introduction port of the semiconductor processing apparatus 118, and a determination of these metal atoms was conducted by means of TR-XSF (total reflection X-ray fluorescence spectroscopy). In the case of the gas supply system of the conventional example, metals such as Fe, Cr, Ni, Mn and the like were detected; however, no metals were detected from the gas supply system of the present embodiment.

In the super pure water supply system shown in FIG. 1, when super pure water is not being used, the super pure water is returned to the source water tank 105, and thereby, it is possible to prevent the contamination of the water quality and of the pure water supply system. Water quality detection apparatuses 107, such as a particle measurement apparatus and a resistivity measurement apparatus and the like, are provided on the discharge recycling line 106 of the super pure water which has been used for washing, so that the quality of the discharged water is monitored, and by means of the opening and closing of the double three-way valve 108, discharged water having a relatively high degree of purity is returned to the source water tank 105 via pipe 109, while discharged water having a comparatively low degree of purity is discharged outside the system via pipe 110. In particular, by making double three-way valve 101 an automatic valve, it is possible to conduct the automatic washing and desiccation of the welded portions by setting a washing period. Furthermore, in the above example, the discharge recycling line 106 of the super pure water which has been employed in washing is connected to the source water tank 105; however, it may be connected between activated carbon column 111 and ion exchanging resin column 112 as well. Furthermore, an ultraviolet irradiation apparatus may be employed between activated carbon column 111 and ion exchanging resin column 112 for the purposes of sterilization and removal of organic materials present in the water.

Embodiment 2

Figure 2:
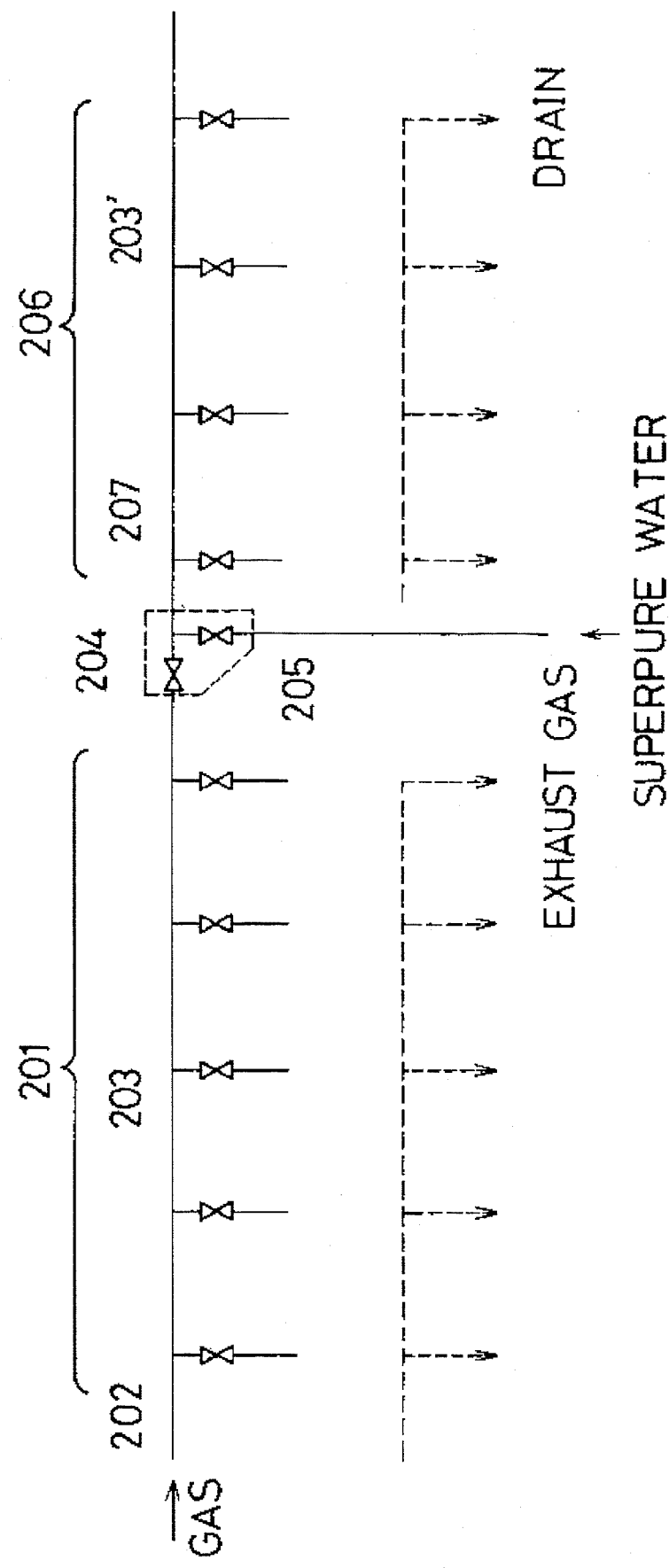
FIG. 2 is a conceptual diagram showing a second embodiment of the present invention.

A second embodiment of the present invention is shown in FIG. 2.

FIG. 2 shows a welding system in which a fluid supply pipe system is divided into blocks, the nitrogen purge after welding and super pure water washing is conducted simultaneously with the super pure water washing, and the installation speed of the fluid supply system is thus increased.

The block 201 of the fluid supply system is at the stage at which welding and super pure water have been completed, and a nitrogen gas purge is being conducted. Nitrogen gas is introduced from a super high purity fluid supply source from one end of fluid supply block 201, and the purging and desiccation of pipe supply system 201, which has been washed with super pure water, is conducted. Flow diversion valves 203 are employed as gas discharge valves during welding and as water discharge valves during super pure water washing; in the diagram, the open state thereof is shown, and the purged gas is discharged outside the system via these valves. The double three-way valve 204 is shown in a closed state. Furthermore, it is possible that only the flow diversion valve 203 at the extreme downstream side is opened, while the remainder of the flow diversion valves 203 are closed.

Block 206 is isolated from block 201 by means of valves, and is shown at the stage in which super pure water washing is being conducted. This block 206 is connected to a pure water supply system via a double three-way valve 204, and the super pure water is supplied to pipe 207 and conducts washing. The discharged super pure water which has been used for washing is recycled via flow diversion valves 203'.

As described above, it is possible to conduct welding, super pure water washing, and desiccation, by block of the fluid supply pipe system, and thereby, it is possible to increase the installation speed.

Embodiment 3

Figure 3:
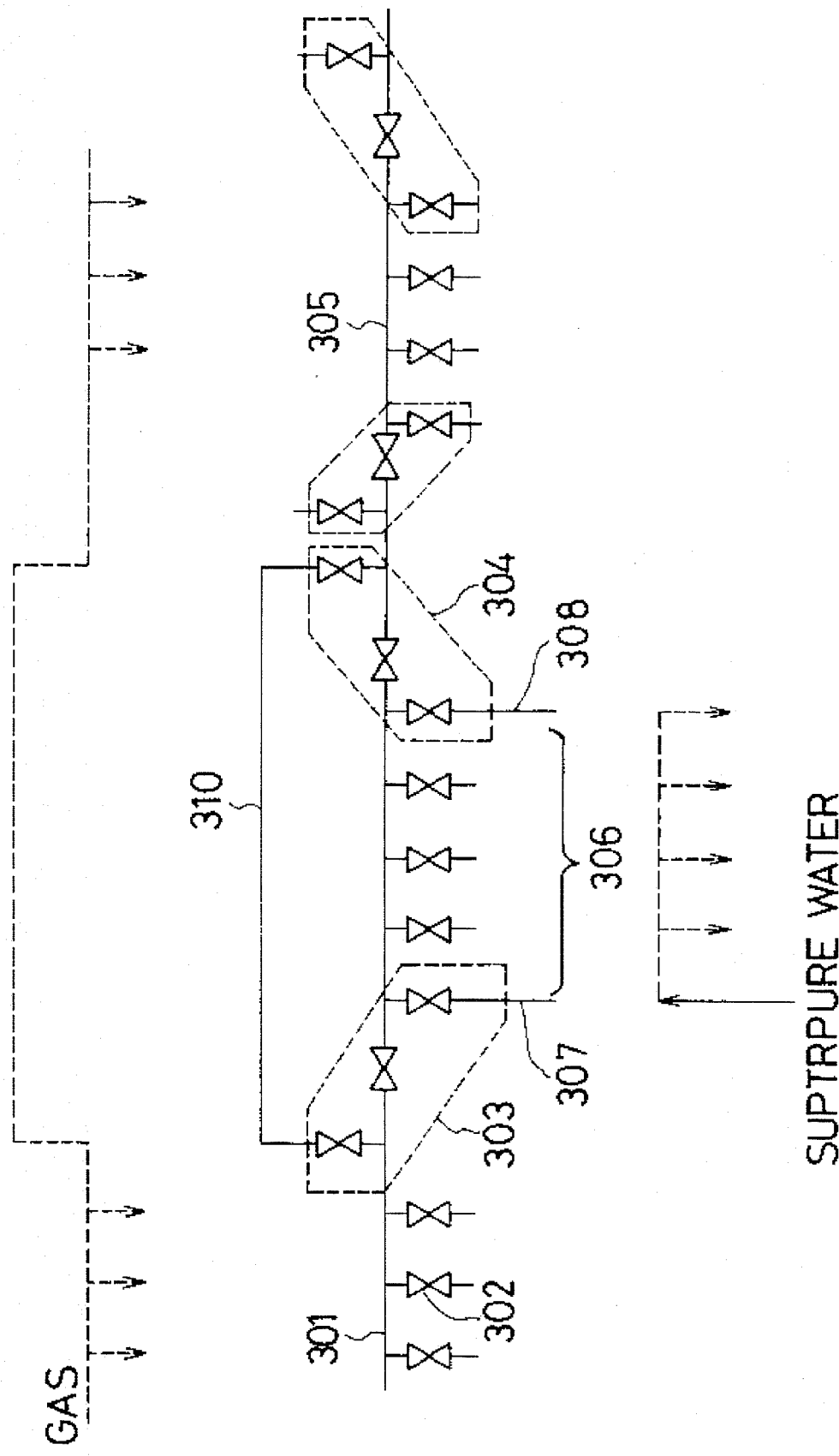
FIG. 3 is a conceptual diagram showing a third embodiment of the present invention.

A third embodiment of the present invention is shown in FIG. 3.

In FIG. 3, a welding system is shown which is capable of connecting a subsequent welding installation while washing a pipe system, the welding installation of which has been completed. Pipe 301 is connected to an inert gas supply source or a back seal gas supply source, and this gas can be used for purging via flow diversion valves 302. The inert gas or back seal gas which is introduced into pipe 301 is supplied to a pipe 305, which is in the process of installation, via triple four-way valves 303 and 304 and bypass pipe 310. Furthermore, super pure water is supplied from a pipe 307, which is connected to a super pure water supply system, to a gas supply system 306, the welding installation of which has been completed, via triple four-way valve 303, and thereby, the gas supply system 306, the welding system of which has been completed, is washed. At this time, the discharged super pure water which has been used in washing passes through discharged water line 308 via triple four-way valve 304, and is either returned to the source water tank shown in FIG. 1 or is discharged outside the system.

The welding system of the present embodiment is capable of increasing the washing effect by disposing triple four-way valves 303 and 304 in the fluid supply system at appropriate distances and conducting washing by portions, in the case in which super pure water treatment cannot be conducted uniformly with respect to inner surfaces of pipes, the welding installation of which has been completed, particularly in fluid supply systems which extend over long distances. Furthermore, in the present embodiment, an explanation was given with respect to the time of the welding installation; however, it is possible to dispose triple four-way valves in the fluid supply system at appropriate intervals, and to add super pure water washing in portions after the installation of the entire super high purity fluid supply system has been completed.

As explained above, in accordance with the welding system in accordance with the present invention, it is possible to remove deposited metal in the vicinity of the surface of the welded portions resulting from metal fumes released from the fused portion, and furthermore, desiccation is conducted by means of an inert gas with a super high degree of purity after washing, so that even if an active special material gas, and in particular, hydrogen chloride gas, which is corrosive, is supplied, it is possible to prevent problems such as the corrosion of the welded portions and the separation of the deposited metal. Accordingly, by using the welding system for super high purity fluid supply pipe systems of the present invention, it is possible to provide a high purity gas supply pipe system having high reliability over long periods of time.

What is claimed is:

1. A welding system for super high purity fluid supply pipe systems in which a plurality of pipe members are to be connected by welding and in which metal deposits caused by such welding are to be removed, said welding system comprising:

means for supplying an inert gas to a first said pipe member during a welding operation;

means for discharging said inert gas from a second said pipe member during a welding operation;

means for supplying super pure water to said first pipe member after completion of said welding operation; and means for discharging super pure water from said second pipe member.

2. The welding system of claim 1, wherein said means for supplying an inert gas, said means for supplying super pure water, said means for discharging an inert gas, and said means for discharging super pure water comprise valves for switching between a flow of super pure water and a flow of inert gas.

3. The welding system of claim 2, wherein said inert gas comprises one of Ar gas and nitrogen gas.

4. The welding system of claim 2, wherein said inert gas comprises Ar gas to which hydrogen gas has been added.

5. The welding system of claim 1, wherein said inert gas comprises one of Ar gas and nitrogen gas.

6. The welding system of claim 1, wherein said inert gas comprises Ar gas to which hydrogen gas has been added.

7. The welding system of claim 1 including means for, after said water supplying step, supplying an inert gas to said first pipe member and discharging said inert gas from said second pipe member.

8. A method of connecting a plurality of pipe members by welding into a superhigh purity fluid supply system and for removing metal deposits caused by such welding, said method comprising:

welding first and second pipe members while supplying an inert gas to said first pipe member and discharging said inert gas from said second pipe member;

after said welding operation supplying super pure water to said first pipe member and discharging said water from said second pipe member.

9. The method according to claim 8 and further including the step of, after said water supplying step, supplying an inert gas to said first pipe member and discharging said inert gas from said second pipe member.

\* \* \* \* \*